United States Patent
Lo

(10) Patent No.: US 9,475,350 B2
(45) Date of Patent: Oct. 25, 2016

(54) TIRE PRESSURE MEASUREMENT APPARATUS

(71) Applicant: Chi-Liang Lo, Taichung (TW)

(72) Inventor: Chi-Liang Lo, Taichung (TW)

( * ) Notice: Subject to any disclaimer, the term of this patent is extended or adjusted under 35 U.S.C. 154(b) by 216 days.

(21) Appl. No.: 14/327,528

(22) Filed: Jul. 9, 2014

(65) Prior Publication Data

US 2014/0318231 A1    Oct. 30, 2014

(51) Int. Cl.
*B60C 23/02* (2006.01)
*B60C 23/04* (2006.01)

(52) U.S. Cl.
CPC ................ *B60C 23/0496* (2013.01)

(58) Field of Classification Search
CPC ... B60C 23/0496; B60C 23/02; G01M 17/02
See application file for complete search history.

(56) References Cited

U.S. PATENT DOCUMENTS

| | | | | |
|---|---|---|---|---|
| 5,844,131 A * | 12/1998 | Gabelmann | ............. | B60C 23/04 73/146.8 |
| 6,945,104 B2 * | 9/2005 | Uleski | ................ | B60C 23/0494 340/443 |
| 7,040,155 B1 * | 5/2006 | Lundell | ............... | B60C 23/0494 73/146.8 |
| 7,395,702 B2 * | 7/2008 | Qiu | .................... | B60C 23/0494 137/224 |
| 7,562,566 B2 * | 7/2009 | Liao | .................... | B60C 23/0494 73/146 |
| 8,327,700 B2 * | 12/2012 | Nagora | ............... | B60C 23/0494 73/146 |
| 8,474,475 B2 * | 7/2013 | Palaoro | ............... | B60C 23/0408 137/227 |
| 2008/0302425 A1 * | 12/2008 | Hettle | ................. | B60C 23/0408 137/227 |
| 2009/0095359 A1 * | 4/2009 | Campau | ............. | B60C 23/0496 137/226 |
| 2010/0024539 A1 * | 2/2010 | Hamm | ................ | B60C 23/0408 73/146.5 |
| 2012/0235809 A1 * | 9/2012 | Cantarelli | ........... | B60C 23/0408 340/445 |
| 2014/0311233 A1 * | 10/2014 | Yu | ....................... | B60C 23/0494 73/146.8 |
| 2014/0318231 A1 * | 10/2014 | Lo | ....................... | B60C 23/0496 73/146.8 |

* cited by examiner

*Primary Examiner* — Andre Allen

(57) ABSTRACT

A tire pressure measurement apparatus is provided with a housing including a dome-shaped cavity on a rear end, bottom projections, and a channel communicating with the cavity; a valve including a curved head complimentarily disposed in the cavity, an internally threaded cylindrical member projecting out of the head through the cavity into the channel wherein the cylindrical member is limited by either side of the channel; and an externally threaded fastener driven through the channel into the cylindrical member to threadedly secure the housing and the head of the valve together. The housing is configured to rotate about the valve along a lengthwise axis of the valve. The housing is configured to pivot about the valve along a line passing through the channel. The pivot of the housing about the valve is stopped when the housing contacts either side of the channel.

1 Claim, 6 Drawing Sheets

TIRE PRESSURE MEASUREMENT APPARATUS

BACKGROUND OF THE INVENTION

1. Field of the Invention

The invention relates to tire pressure measurement apparatuses and more particularly to an apparatus having a structure for fastening in an automobile tire in a universal joint type fashion and for wirelessly sending pressure of the tire to a driver.

2. Description of Related Art

Pressure of a tire of a car is critical to car safety. It is understood that insufficient pressure of tire increase fuel consumption and excessive pressure of tire may explode when driving. Thus, there is a trend of installing a tire pressure measurement apparatus for wirelessly sending tire pressure to a driver.

A conventional tire pressure measurement apparatus 900 having means for wirelessly sending tire pressure to a driver is shown in FIG. 7. The apparatus 900 includes a housing 920 having a central channel 924 with a dome-shaped opening at one end, a threaded valve 940 having a dome-shaped head 942 rotatably mounted in the opening of the channel 924, and a threaded fastener (e.g., screw) 960 driven through the channel 924 into the head 942 to assemble the housing 920 and the valve 940. The housing 920 is adapted to pivot about the head 942 to adjust its position relative to the surface of a wheel rim.

However, the conventional tire pressure measurement apparatus 900 of FIG. 7 has the following disadvantage: the housing 920 may vibrate laterally about the valve 940 due to centrifugal force when driving. As such, the screw 960 may loosen and malfunction.

For eliminating the above disadvantage, another conventional tire pressure measurement apparatus 900 having means for wirelessly sending tire pressure to a driver is shown in FIG. 8. The apparatus 900 includes a housing 920 having a central channel 924 with a rectangular mouth at one end, a threaded valve 940 having a projecting head 944 with four flat surfaces perpendicular to each other rotatably mounted in the mouth of the channel 924, and a threaded fastener (e.g., screw) 960 driven through the channel 924 into the head 944 to assemble the housing 920 and the valve 940.

However, the conventional tire pressure measurement apparatus 900 of FIG. 8 has the following disadvantages: Its installation is somewhat difficult this is because the valve 940 is mounted on the wheel rim using a nut (not shown). It is time consuming to correctly mount the apparatus 900 on the wheel rim due to complimentary engagement of the head 944 with the mouth of the channel 924. An incorrect assembly of the head 944 in the mouth of the channel 924 can loosen of the housing 920.

Thus, the need for improvement still exists.

SUMMARY OF THE INVENTION

It is therefore one object of the invention to provide a tire pressure measurement apparatus comprising in combination a housing including a dome-shaped cavity formed on a rear end, a plurality of projections on a bottom, and a channel communicating with the cavity; a valve including a curved head complimentarily disposed in the cavity, an internally threaded cylindrical member projecting forwardly out of the head through the cavity into the channel wherein the cylindrical member is limited by either side of the channel; and an externally threaded fastener driven through the channel into the cylindrical member to threadedly secure the housing and the head of the valve together; wherein the housing is configured to rotate about the valve along a lengthwise axis of the valve; wherein the housing is configured to pivot about the valve along a line passing through the channel; and wherein the pivot of the housing about the valve is stopped when the housing contacts either side of the channel.

The above and other objects, features and advantages of the invention will become apparent from the following detailed description taken with the accompanying drawings.

DETAILED DESCRIPTION OF THE INVENTION

Figure 1:
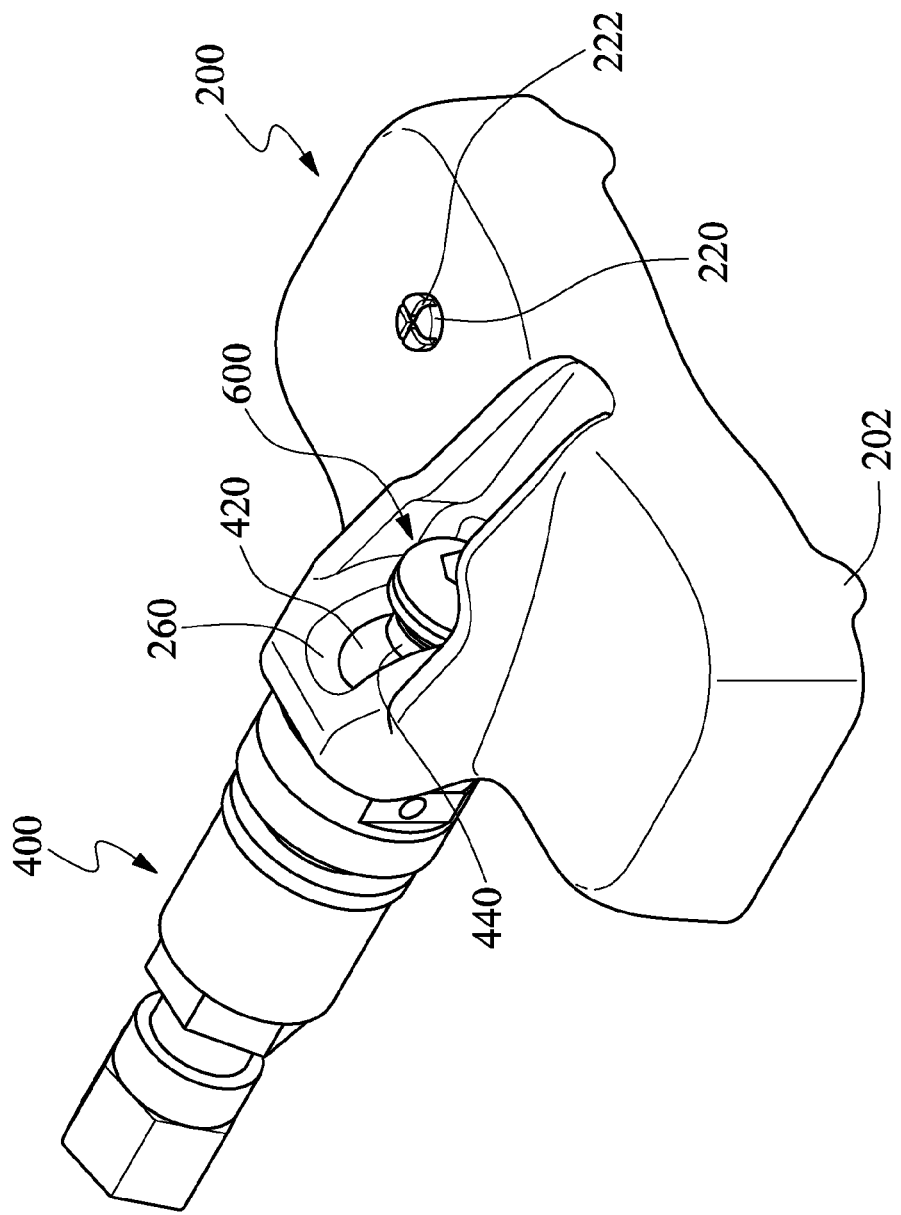
FIG. 1 is a perspective view of a tire pressure measurement apparatus according to the invention.
Figure 2:
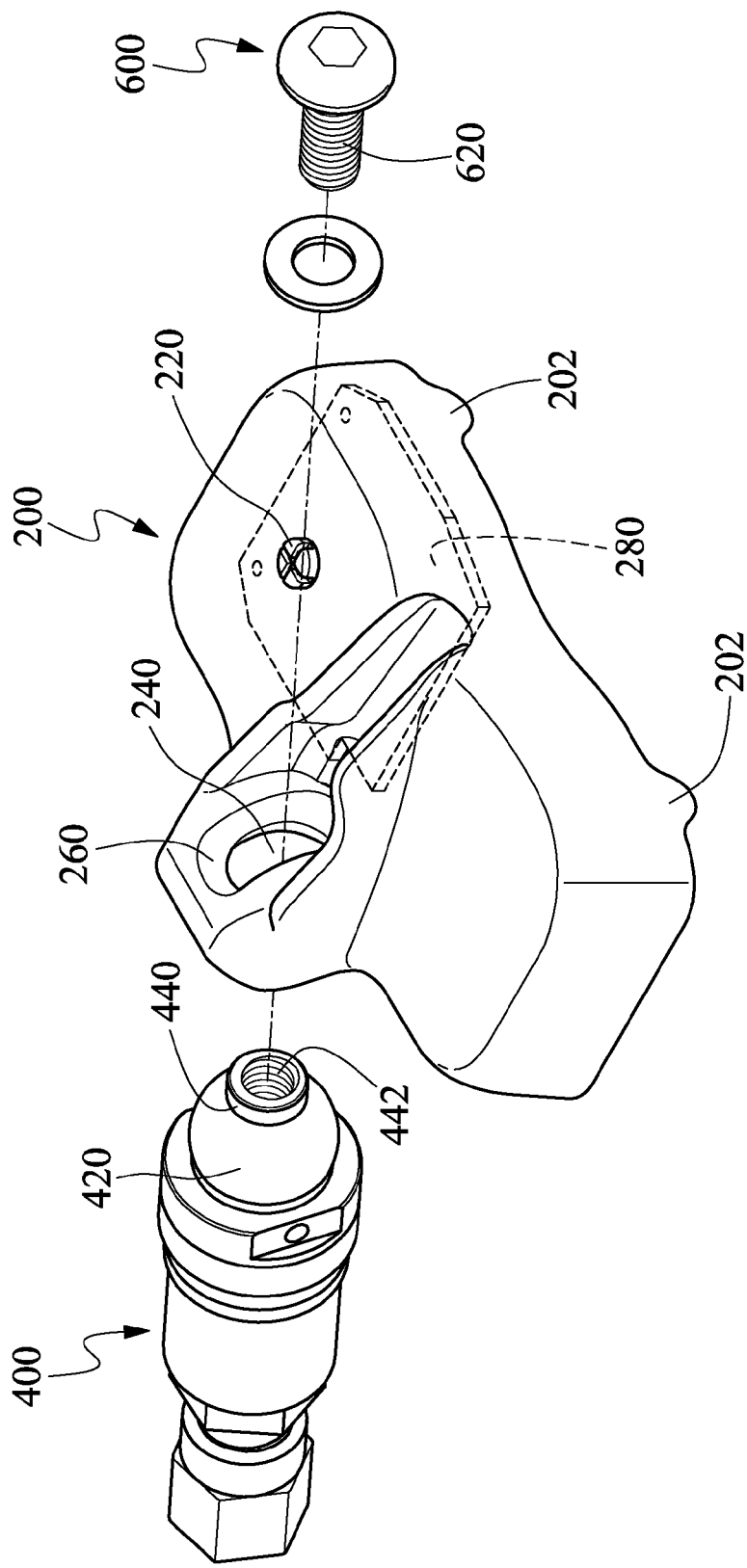
FIG. 2 is an exploded view of the tire pressure measurement apparatus.
Figure 3:
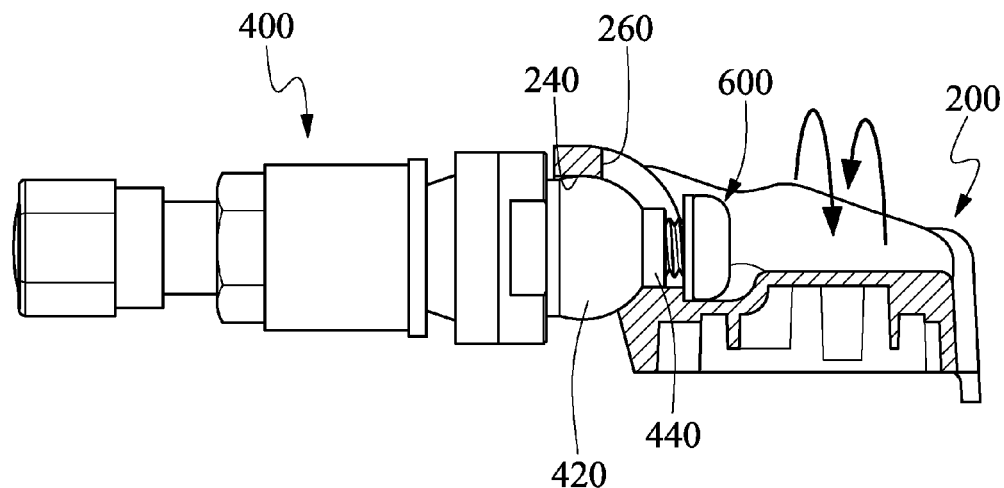
FIG. 3 is a side elevation in part section of FIG. 1 showing clockwise and counterclockwise rotations of the housing.
Figure 4:
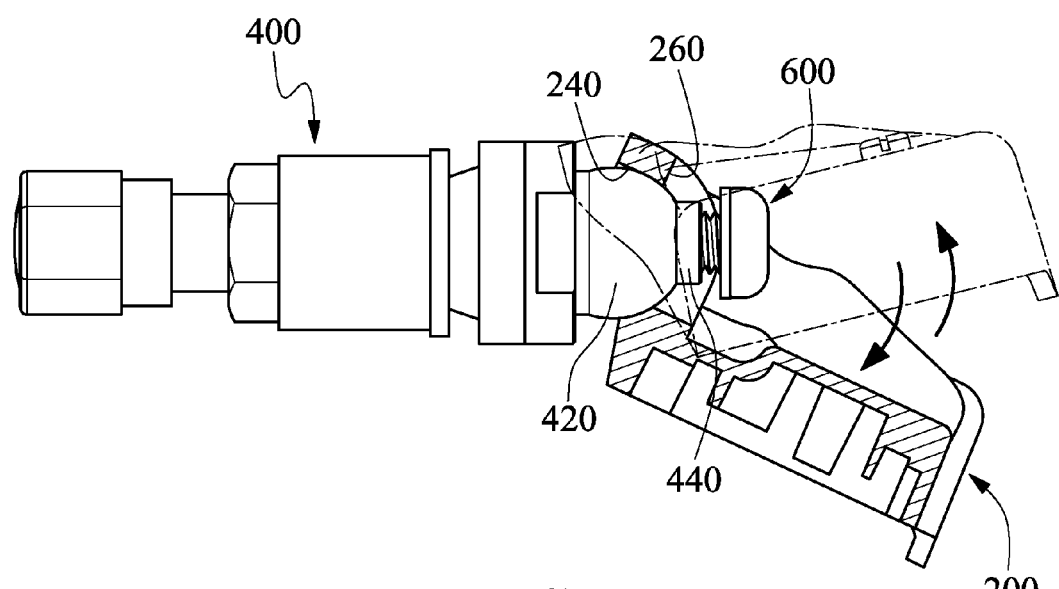
FIG. 4 is a view similar to FIG. 3 showing downward and upward rotations of the housing.
Figure 5:
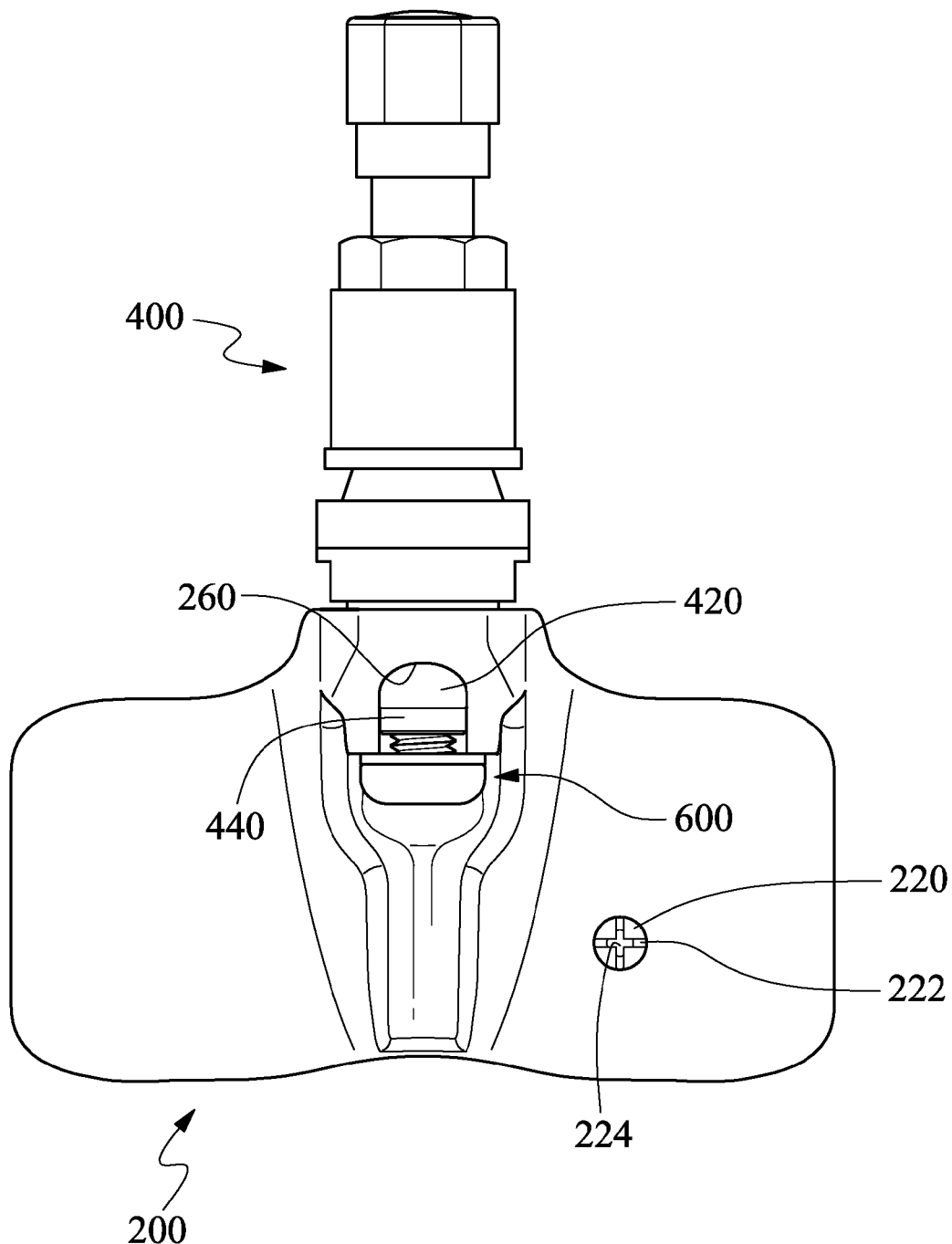
FIG. 5 is a top view of FIG. 1.
Figure 6:
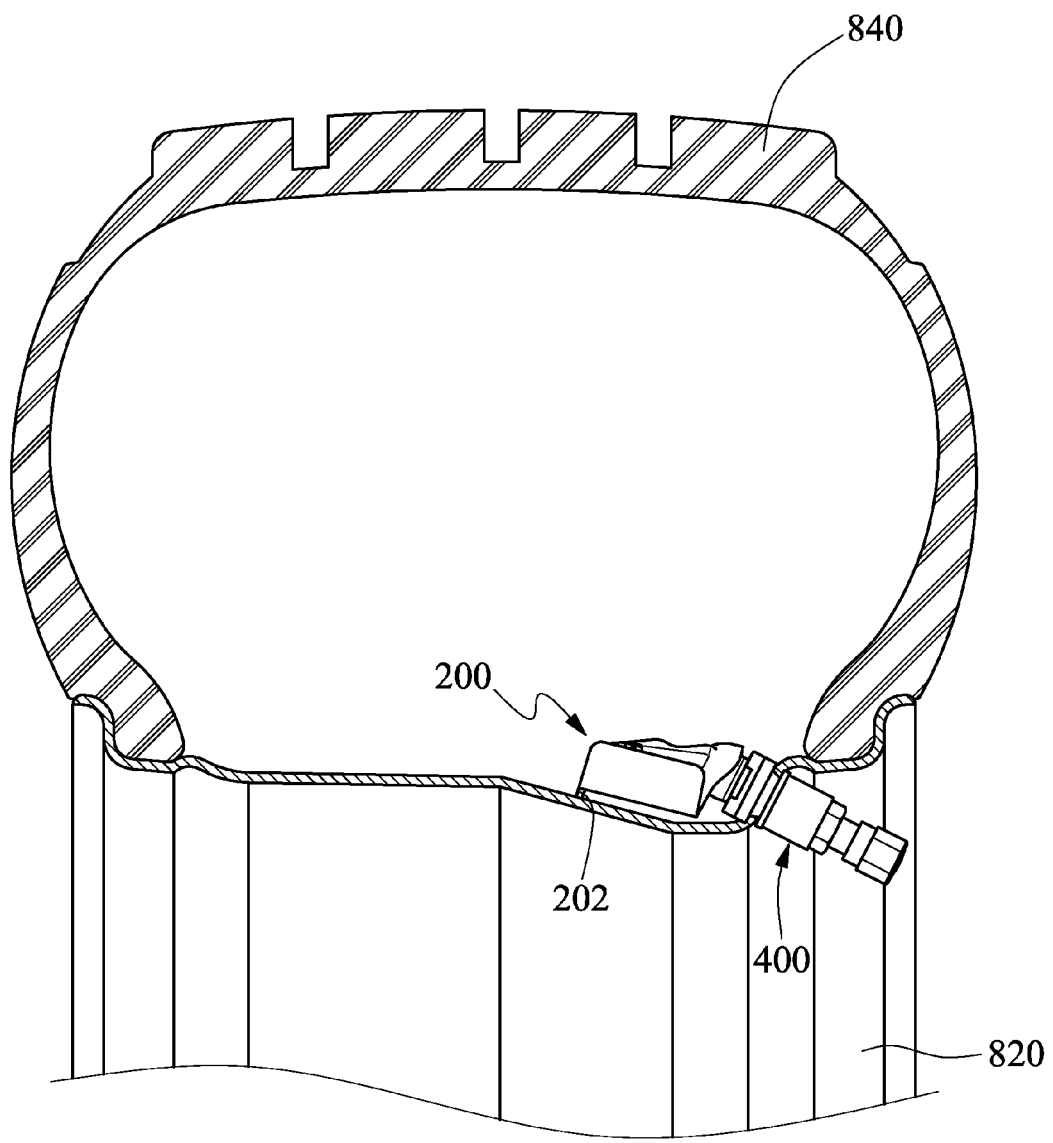
FIG. 6 is a longitudinal section of a portion of a wheel tire with the tire pressure measurement apparatus mounted therein.
Figure 7:
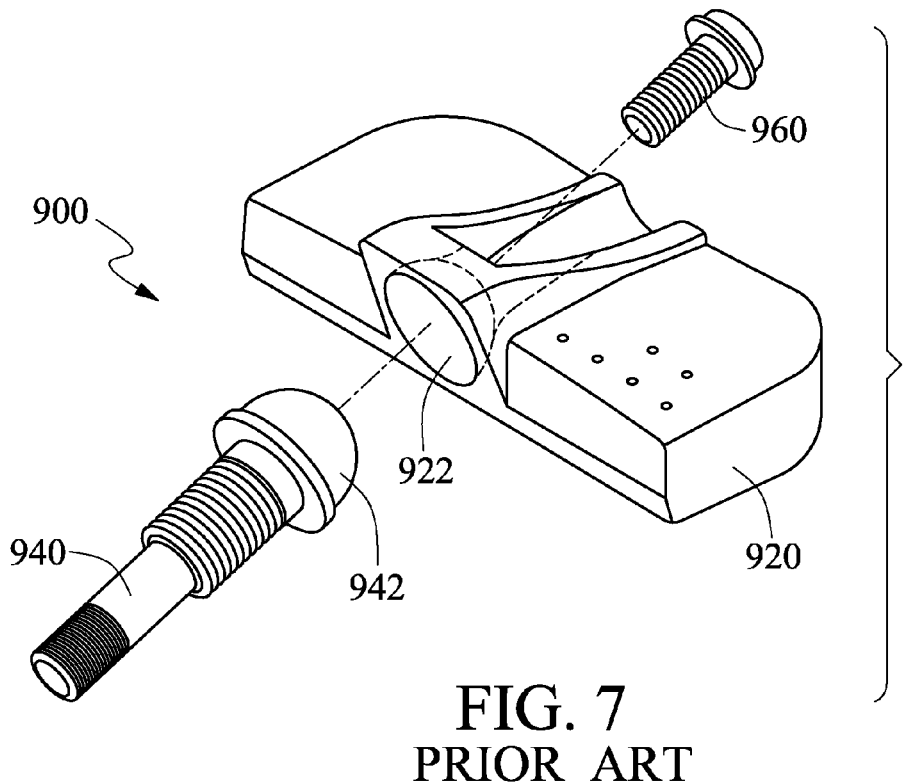
FIG. 7 is an exploded view of a conventional tire pressure measurement apparatus.
Figure 8:
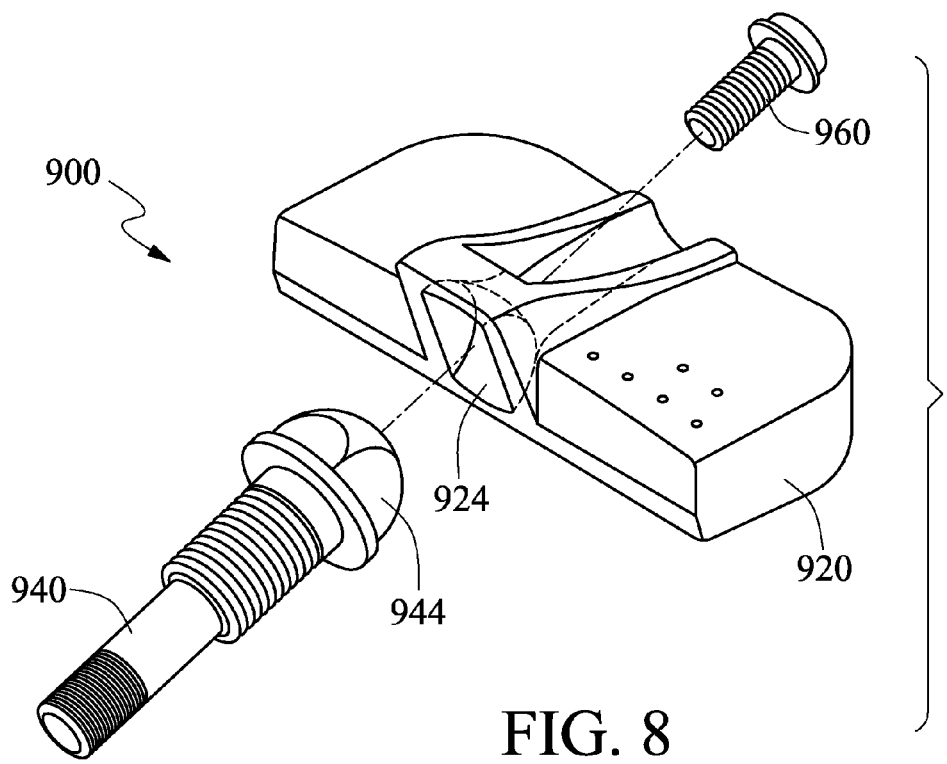
FIG. 8 is an exploded view of another conventional tire pressure measurement apparatus.

Referring to FIGS. 1 to 6, an apparatus for indication pressure of a tire in accordance with the invention comprises the following components as discussed in detail below.

A housing 200 includes a raised inlet unit 220 on a surface, the inlet unit 220 having an inlet groove 222 and an inlet port 224 on a bottom of the inlet groove 222 and communicating with inside of the housing 200. The width of the groove 222 is slightly less than a diameter of the inlet port 224. A dome-shaped cavity 240 is formed on a rear end of a raised top of the housing 200. A channel 260 has one end communicating with the cavity 240 and the other end open to a rear end of the housing 200. Two projections 202 are formed on two front corners of a rectangular bottom of the housing 200. A measurement device 280 for measuring pressure of a tire 840 mounted on a rim 820 is provided in the housing 200 which is disposed in the tire 840. The measurement device 280 further creates a signal as a representation of the pressure of the tire 840 and wirelessly sends the signal to an instrument on a dashboard for visually alerting to a driver. Furthermore, the projections 202 are rested on the rim 820 as support of the housing 200.

A valve 400 includes a curved head 420, a cylindrical member 440 projecting out of the head 420, and internal threads 442 formed on an inner surface of the cylindrical member 440. The head 420 is rotatably mounted in the cavity 240. A fastener 600 has a threaded shank 620 driven through the channel 260 into the cylindrical member 440 to threadedly secure to the internal threads 442. A shoulder between the shank 620 and the head of the fastener 600 is stopped by a front end of the channel 260. Thus, the valve 400 and the housing 200 are assembled. Further, the valve 400 is disposed through the rim 820. It is envisaged by the invention that the apparatus is secured when driving due to the universal joint type coupling of the housing 200 and the valve 400 (see FIGS. 3 and 4).

The measurement device 280 is a power supply (not shown) for supplying power to the normal operation of the measurement device 280, a wireless transmission module (not shown), an ID module, a pressure sensor (not shown), a temperature sensor (not shown), or a combination thereof. The wireless transmission unit is capable of transmitting signal by radio frequency, Bluetooth, Wi-Fi, or a combination thereof. The signal as a representation of the pressure of the tire 840 and is wirelessly sent to an instrument on a dashboard for visually alerting to a driver. Alternatively, the signal is sent to an electronic device such as a display, a notebook computer, a PDA, a Smartphone, or a combination thereof. Still alternatively, the signal is converted into a buzzing representation, a digital representation, an illumination representation, a voice representation, or a combination thereof.

While the invention has been described in terms of preferred embodiments, those skilled in the art will recognize that the invention can be practiced with modifications within the spirit and scope of the appended claims.

What is claimed is:

1. A tire pressure measurement apparatus comprising in combination:
   a housing including a dome-shaped cavity formed on a rear end, a plurality of projections on a bottom, and a channel communicating with the cavity;
   a valve including a curved head disposed in the cavity, an internally threaded cylindrical member projecting forwardly out of the head through the cavity into the channel wherein the cylindrical member is limited by either side of the channel; and
   an externally threaded fastener driven through the channel into the cylindrical member to threadedly secure the housing and the head of the valve together;
   wherein the housing is configured to rotate about the valve along a lengthwise axis of the valve;
   wherein the housing is configured to pivot about the valve along a line passing through the channel; and
   wherein the pivot of the housing about the valve is stopped when the cylindrical member contacts either side of the channel.

\* \* \* \* \*